(12) United States Patent
Krantz

(10) Patent No.: US 7,812,722 B2
(45) Date of Patent: Oct. 12, 2010

(54) DUAL ORIENTATION METAL SCANNER

(75) Inventor: Norman LaVar Krantz, San Jose, CA (US)

(73) Assignee: Zircon Corporation, Campbell, CA (US)

( * ) Notice: Subject to any disclaimer, the term of this patent is extended or adjusted under 35 U.S.C. 154(b) by 715 days.

(21) Appl. No.: 11/680,372

(22) Filed: Feb. 28, 2007

(65) Prior Publication Data

US 2008/0204257 A1    Aug. 28, 2008

(51) Int. Cl.
*G08B 13/24* (2006.01)
(52) U.S. Cl. .................... 340/551; 340/552
(58) Field of Classification Search ............ 340/551, 340/552, 500, 600; 324/67, 109, 326, 329, 324/345
See application file for complete search history.

(56) References Cited

U.S. PATENT DOCUMENTS

| 4,719,426 | A | * | 1/1988 | Weiss | 324/345 |
| 5,365,163 | A | * | 11/1994 | Satterwhite et al. | 324/67 |
| 5,444,364 | A | * | 8/1995 | Satterwhite et al. | 324/67 |
| 5,519,329 | A | * | 5/1996 | Satterwhite | 324/690 |
| 7,414,404 | B2 | * | 8/2008 | Keene | 324/329 |
| 2008/0258739 | A1 | * | 10/2008 | Niwa et al. | 324/654 |

FOREIGN PATENT DOCUMENTS

DE    196 05 305 A1  *  8/1997

* cited by examiner

*Primary Examiner*—Van T. Trieu

(57) ABSTRACT

An ergonomically designed metal detector is provided. The metal detector allows for operation of the metal detector between two modes of operation while maintaining an operator's hand position relative to the surface.

25 Claims, 7 Drawing Sheets

DUAL ORIENTATION METAL SCANNER

CROSS-REFERENCE TO RELATED APPLICATIONS

Not applicable.

BACKGROUND OF THE INVENTION

1. Field of the Invention

The invention relates to tools and in particular to metal detector, having a handle positioned relative to a sensor, used for finding a metal object, hidden behind a surface.

2. Background of the Invention

Metal detectors are well known tools used to find ferrous and non-ferrous materials sometimes hidden behind or under a surface. Such detectors often use an inductive coil for finding metal. The coil may be wound such that it occupies a 2-dimensional plane or near plane or alternatively may be wound laterally around a center cylinder. Such cylinder coils are often placed at the end of a handle either perpendicularly in a hammer-like configuration or end-on-end in a wand-like configuration.

In a hammer configuration, the center axis of the coil is perpendicular to the center axis of the handle and located at the end of the handle. Such detectors may typically be used with the center axis of the handle positioned parallel to a target surface such that the round end of the coil is closest to the surface. If an operator desires to detect metal using the elongated cylinder portion of the coil, the operator rotates the handle 90 degrees about the handle-coil intersection. Such a rotation causes a significant change in positioning of the operator's hand.

In a wand configuration, the center axis of the coil is either inline with the center axis of the handle or offset but parallel to the center axis of the handle. Such detectors may typically be used with the center axis of the coil positioned at an acute angle to the target surface. If an operator desires to detect a metal object with the coil's center axis positioned parallel and perpendicular to the surface, the operator makes significant changes in positioning of the operator's hand and/or wrist.

Other handle-coil positions exists, however, all provide less than a 20-degree offset between a handle and a coil from that of either a hammer configuration or a wand configuration. With such low-angle handle-coil offset, an operator must makes significant changes in positioning of the operator's hand and/or wrist when switching between having the coil's round end face the surface verses having the coil's elongated cylinder face the surface. Additionally, neither the hammer nor wand configurations provide for easy repositioning between a perpendicular and parallel positions without a significant repositioning of an operator's hand and/or wrist. Therefore, a need exists for a metal detector that minimizes repositioning of an operator's hand and wrist when switching a coil's center axis positioning between perpendicular and parallel to target surface.

SUMMARY

Some embodiments of the present invention provide for a

Some embodiments of the present invention provide for a method

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

DETAILED DESCRIPTION OF THE INVENTION

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense.

Figure 1A:
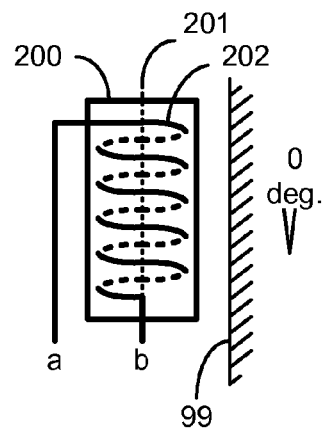
FIGS. 1A and 1B illustrate a sensor positioned relative to a surface.
Figure 1B:
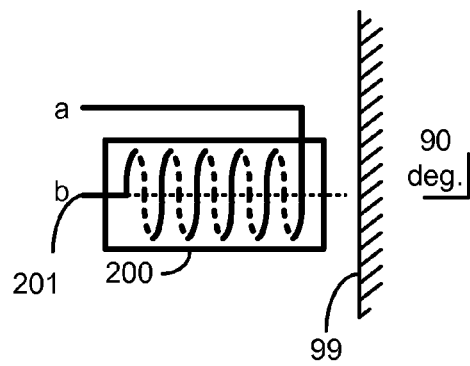

FIGS. 1A and 1B illustrate a sensor 200 positioned relative to a surface 99. The sensor 200 includes a coil 202 around a core. The coil 202 defines a center axis 201 of the sensor, where the center axis 201 is positioned down the center of the coil 202. In FIG. 1A, the sensor 200 is positioned such that the center axis 201 is parallel to the surface 99. In this first position, the sensor 200 provides an elongated and narrow detection pattern. The first position is beneficial for detecting over a wide area and deep into the surface with each pass of the sensor over the surface 99. In FIG. 1B, the sensor 200 is positioned such that the center axis 201 is perpendicular to the surface 99. In this second position, the sensor 200 provides a narrow circular or pinpoint. The second position is beneficial for pin-point detection of a metal object hidden behind a smaller area of the surface 99.

FIGS. 2A, 2B, 3A and 3B illustrate metal detectors 101 and 102 having a perpendicular hammer-like relationship and a parallel wand-like relationship between a metal detector's sensor coil 200 and handle 300.

Figure 2A:
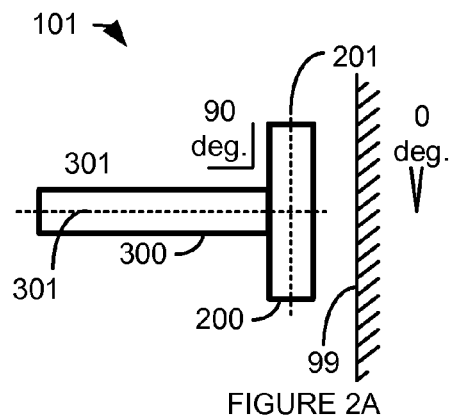
FIGS. 2A, 2B, 3A and 3B illustrate metal detectors having a perpendicular hammer-like relationship and a parallel wand-like relationship between a metal detector's sensor coil and handle.
Figure 2B:
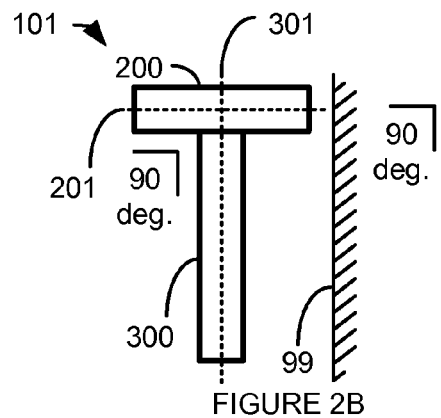

FIGS. 2A and 2B show metal detector 101 having a handle and a sensor in a hammer configuration with, the center axis 201 of the sensor 200 perpendicular to the center axis 301 of the handle 300 thereby forming a 90-degree angle between the center axes of the sensor 200 and the handle 300. In FIG. 2A, the metal detector 101 is positioned such that the elongated cylinder 200 and the sensor's center axis 201 are parallel to the surface 99 (0 degree deference) with the handle 300 perpendicular to the surface 99.

In FIG. 2B, the metal detector 101 has been rotated 90 degrees with reference to the intersection of the handle 300 and the sensor 200. After the 90-degree rotation, the center axis 201 of the handle 200 is perpendicular to the surface 99 (90-degree difference) and the center axis 301 of the handle 300 is parallel to the surface 99. Significant repositioning of an operator's hand and/or wrist is necessary to change between the two positions shown in FIGS. 2A and 2B.

Figure 3A:
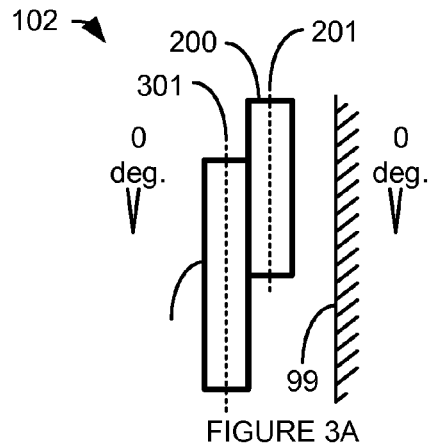
Figure 3B:
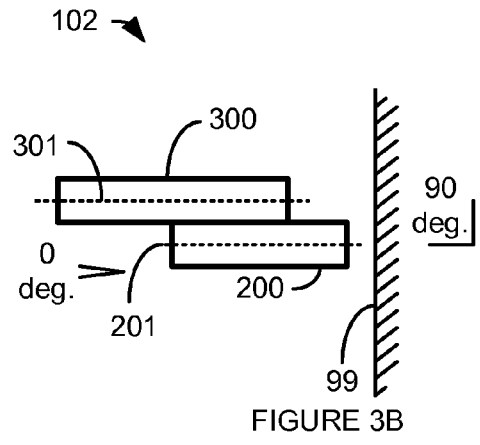

FIGS. 3A and 3B show metal detector 102 having a handle and a sensor in a wand configuration with, the center axis of the coil parallel to the center axis of the handle thereby forming a zero-degree angle between the center axes of the sensor 200 and the handle 300. In FIG. 3A, the metal detector 102 is positioned such that the center axis 201 of the sensor 200 and the center axis 301 of the handle 300 are parallel to the surface 99 (zero-degree deference).

In FIG. 3B, the metal detector 102 has been rotated 90 degrees with reference to the handle 300 and the sensor 200 as shown. After the 90-degree rotation, the center axis 201 of the handle 200 and the center axis 301 of the handle are perpendicular to the surface 99 (90-degree difference). Again, significant repositioning of an operator's hand and/or wrist is necessary to change between the two positions shown in FIGS. 3A and 3B.

FIGS. 4A, 4B, 5A and 5B show a metal detector 100 in a first position and in a second position, in accordance with embodiments of the present invention. The metal detector 100 includes a sensor 200 having a core and a coil around the core, wherein the coil defines a center axis 201 of the sensor. The core may be an air core or a solid core such as provided by a ferrous cylinder. In some embodiments, the sensor 200 includes a core approximately 3 inches (76.2 mm) long with a 0.38 inch (10 mm) diameter having a coil with approximately 120 turns that results in an inductance of L=850 mH.

The metal detector 100 also includes a grip or handle 300 coupled to the sensor 300, where the handle 300 defines a center axis 301 of the handle 300. The handle may have a first gripping side 302 and a second gripping side 303. The relative positioning of the sensor 200 with respect to the handle 300 may allow for improved agility for an operator handling the tool 100. The center axis 200 of the sensor 200 and the center axis 301 of the handle 300 define an angle. When this angle is an acute angle near 45 degrees, an operator may reposition the metal detector with no or minimal hand, wrist and arm repositioning. In some embodiments, as shown in FIGS. 4A through 7B, the acute angle is 45 degrees or nearly 45 degrees. An angle within or at +/−5 degrees of 45 degrees provides similar agility. For example, in some embodiments, this acute angle between 40 and 50 degrees (e.g., at 40, 45 or 50 degrees). Similarly, an angle within or at +/−15 degrees of 45 degrees may provide adequate agility. For example, in some embodiments, this acute angle is between 30 degrees and 60 degrees (e.g., at 30, 35, 40, 45, 50, 55 or 60 degrees).

An angle of 45 degrees allows an operator to switch back and fourth between the first and second positions with no or minimal repositioning of the operator's hand and wrist. That is, the operator rotates the metal detector about the center axis 301 of the handle 300 without a significant repositioning. In other words, the operator simply spins the metal detector 100 in the palm of the operator's hand, for example, by using the thumb and index finger. This simple maneuver allows the operator to reposition the metal detector 100 without significant movement of the hand, wrist or arm. An acute angle within +/−5 or +/−15 degrees of 45 degrees provides similar benefits.

Figure 4A:
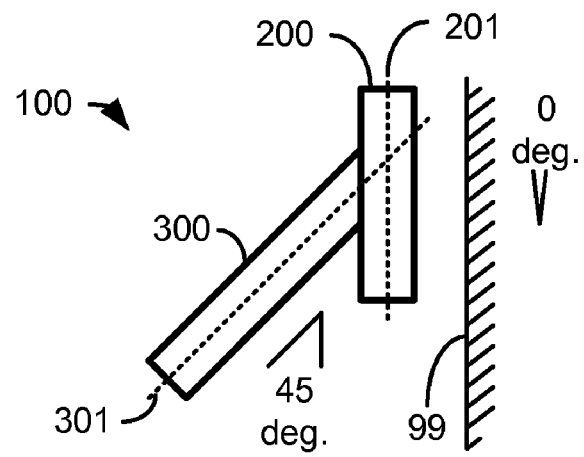
FIGS. 4A, 4B, 5A and 5B show a metal detector, in accordance with embodiments of the present invention.
Figure 4B:
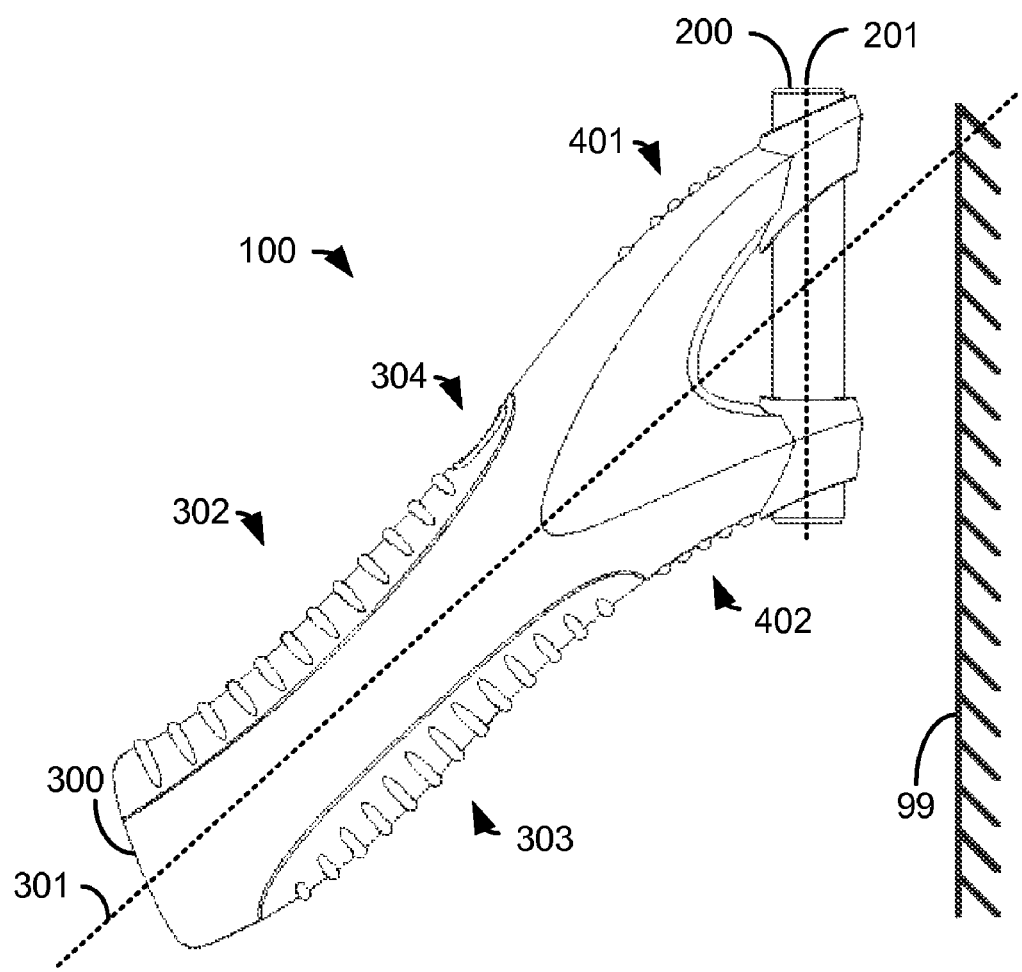

FIGS. 4A and 4B show a rough image and a detailed image, respectively, of a metal detector 100 in a first position with the center axis 201 of the sensor positioned parallel to a surface 99. In the first position, the center axis 201 of the sensor 200 of the metal detector 100 is parallel to a surface 99. In this position, the center axis 301 of the handle 300 is within 30 to 60 degrees (e.g., at 45 degrees) with respect to the surface 99.

Figure 5A:
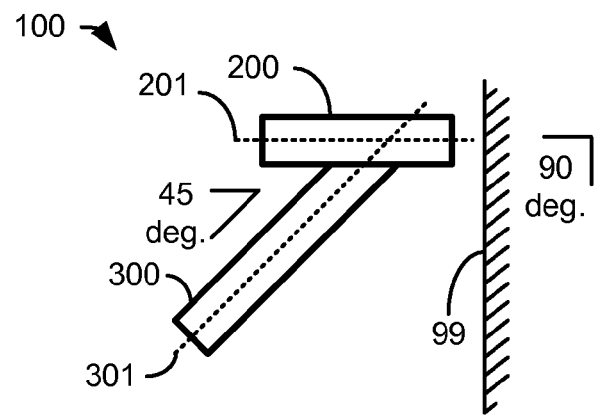
Figure 5B:
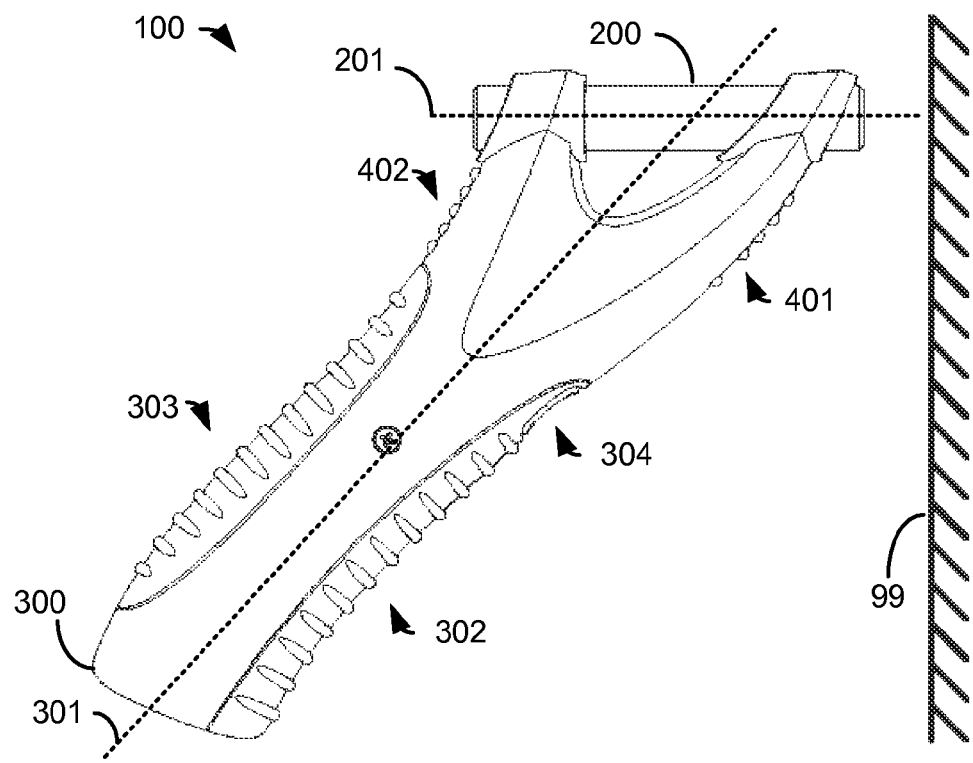

FIGS. 5A and 5B show a rough image and a detailed image, respectively, of a metal detector 100 in a second position with the center axis 201 of the sensor positioned perpendicular to a surface 99. In the second position, the center axis 201 of the sensor 200 of the metal detector 100 is perpendicular to the surface 99. In this position, as with the first position, the center axis 301 of the handle 300 is at an angle within 30 to 60 degrees (e.g., between 40 and 50 degrees or at 45 degrees) with respect to the surface 99.

Some embodiments provide for one or more indicators to indicate a relative strength between a sensor 200 and a metal object (e.g., a metal object hidden behind surface 99). The one or more indicators may include one or more audible indicators and/or one or more visual indicators. An audible indicator may include an audible sound generator such as a speaker, a buzzer or other device projecting sound or vibration.

A visual indicator may include a light emitting element (such as an LED), series of light emitting elements (such as a series of LEDs), an LCD, and/or similar light emitting device. A visual indicator may be visible in multiple or all modes of operation. Alternatively, a visual indicator may be visible while the metal detector 100 is in a particular positioning mode of operation by an operator but not in another positioning mode. For example, a visual indicator may be positioned such that it provides for observation while the metal detector 100 is in a first particular mode of operation (a first position) that is obscured while the metal detector 100 is in different mode of operation (a second position). A complementary visual indicator may be positioned such that it provides for observation while the metal detector 100 is in the second position but is obscured when the detector 100 is in the first position.

FIGS. 4B and 5B show a metal detector 100 including examples of a first visual indicator 401 and a second visual indicator 402. The first indicator 401 may include a single LED or a series of LEDs operable to indicate a relative measurement between the sensor and an object. Each LED may represent a received signal strength is above a particular value. For example, as the metal detector 100 detects a metal object with increased intensity, a sequential LED in the series may be turned on. Furthermore, the first indicator 401 may be positioned, such as on the handle 300, so that it may be readily observed by an operator using the metal detector in the first position when the center axis 201 of the sensor 200 is parallel to a surface 99 (as shown in FIG. 4B).

The second indicator 402 may act as a complementary indicator and may similarly include a single LED or a series of LEDs operable to indicate a relative measurement between the sensor and an object. Again each LED may represent a received signal strength is above a particular value. The second indicator 402 complements the first indictor 401 by mirroring the first indicator. For example, if the first of a series of light emitting elements (such as a series of LEDs) of the first indicator is illuminated, the first of a series of LEDs of the second indicator is also illuminated. Furthermore, the second indicator 402 may be positioned on the handle 300 so that it may be readily observed by an operator using the metal detector 100 in the second position when the center axis 201 of the sensor 200 is perpendicular to the surface 99 (as shown in FIG. 5B).

For the embodiment shown in FIG. 5B, when the metal detector 100 is in the second position, view of the first indicator may be obscured by the handle from an operators perspective. For example, the first indicator 401 may be facing away from the operator while the metal detector 100 is in the second position of FIG. 5B. Similarly, view of the second indicator 402 may be obscured, for example, by the handle 300, when the second indicator 402 is facing away from the operator while the metal detector 100 is in the first position of FIG. 4B.

Some embodiments further include an indicator allowing for observation both when the center axis 201 of the sensor 200 is parallel to a surface (in the first position) and when the center axis 201 of the sensor 200 is perpendicular to the surface (in the second position). For example, a light emitting device may be positioned on or in the handle 300, or on or in the sensor 200, such that it illuminates at least part of the sensor 200 or surface 99. For example, some embodiments provide for a translucent and/or transparent sensor shell, which allows light to pass out from the shell for observation by the operator. Still some embodiments provide for a reflective or partially reflective sensor shell, which allows for light to be reflected off of the shell for observation by the operator. Some embodiments provide a light source for illuminating the surface 99, which may be observed by the operator to indicate sensing of a metal object or other conductor.

The sensor 200 and handle 300 may be coupled together such that the center axis 301 of the handle intersects with the sensor 200. In some embodiments the center axis 201 of the sensor 200 and the center axis 301 of the handle 301 define a plane. When the center axis 301 of the handle 300 passes through the sensor 200, then an operator may feel that his hand is an extension of the sensor, which allows for more intuitive use of the metal detector 100.

In some embodiments, a switch 304, to power internal circuitry, is accessible when an operator grips the handle 300. For example, a switch 304 may be placed on a first gripping side 302 as shown. When the operator uses the metal detector 100 in the first position, the first gripping side 302 and the switch 304 will be facing the operator. Thus, the operator may us a thumb to activate the metal detector 100. When the operator uses the metal detector 100 in the second position, the second gripping side 303 will be facing the operator. Therefore, the first gripping side 302 and the switch 304 will both be facing away from the operator. In this position, the operator may us an index finger to activate the metal detector 100.

Figure 6A:
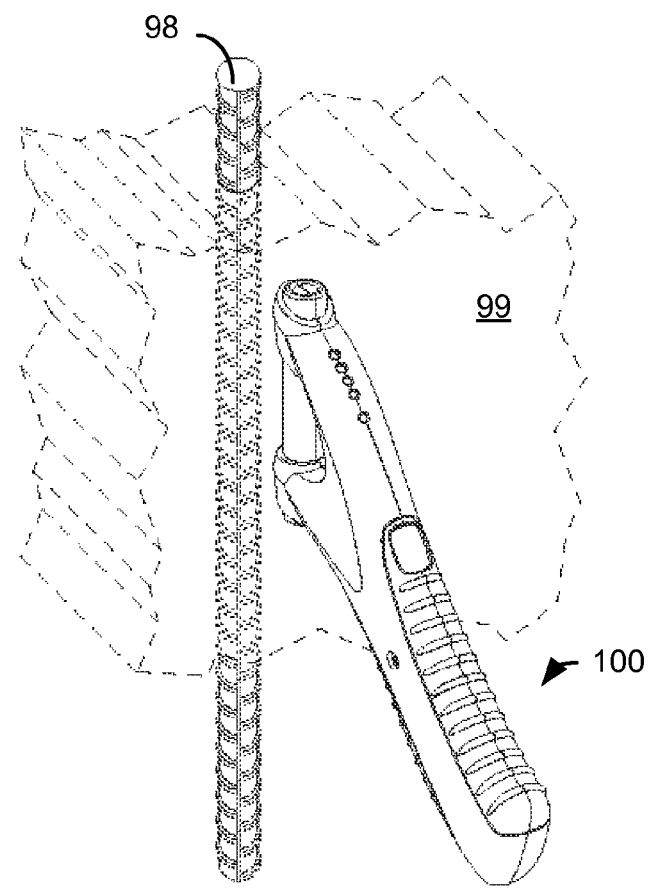
FIGS. 6A, 6B, 7A and 7B show a metal detector positioned over a metal object, in accordance with embodiments of the present invention.
Figure 6B:
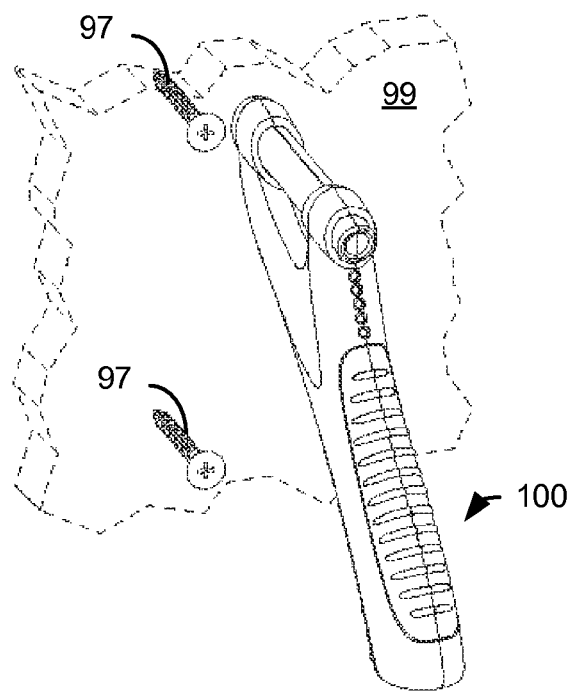

FIGS. 6A, 6B, 7A and 7B show a metal detector 100 positioned over a metal object, in accordance with embodiments of the present invention. In FIG. 6A, the metal detector 100 is positioned to detect a metal object such as a length of rebar 98. When an operator is searching for a length of rebar 98, the metal detector 100 may be positioned in the first position such that the sensor 200 to the surface 99 and thus may also be parallel to the rebar 98. In FIG. 6B, the metal detector 100 is positioned in the second position to detect a metal object such as a screw 97. In this position, the metal detector 100 may be used to detect a small area for a metal object.

Figure 7A:
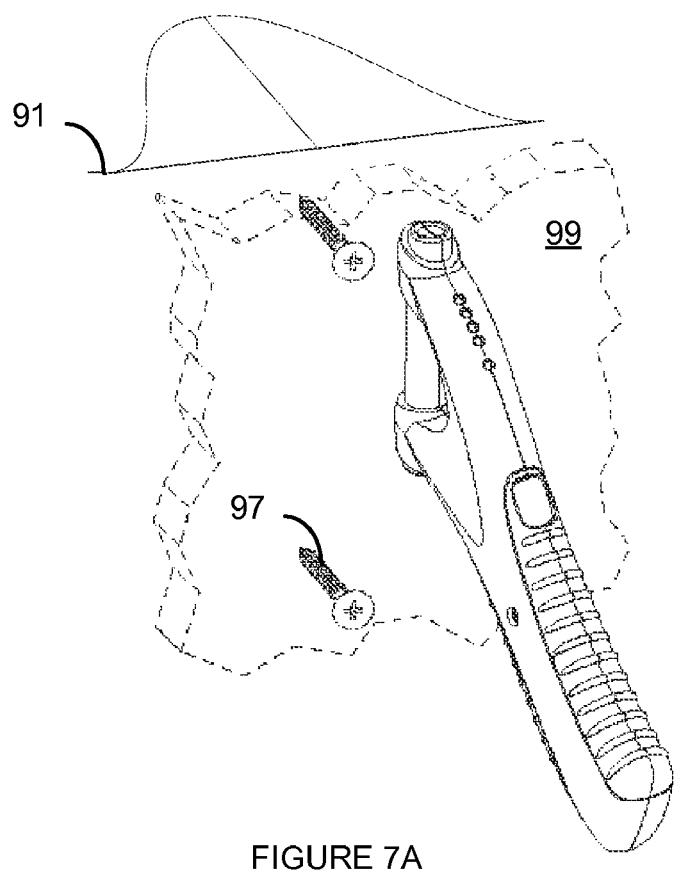
Figure 7B:
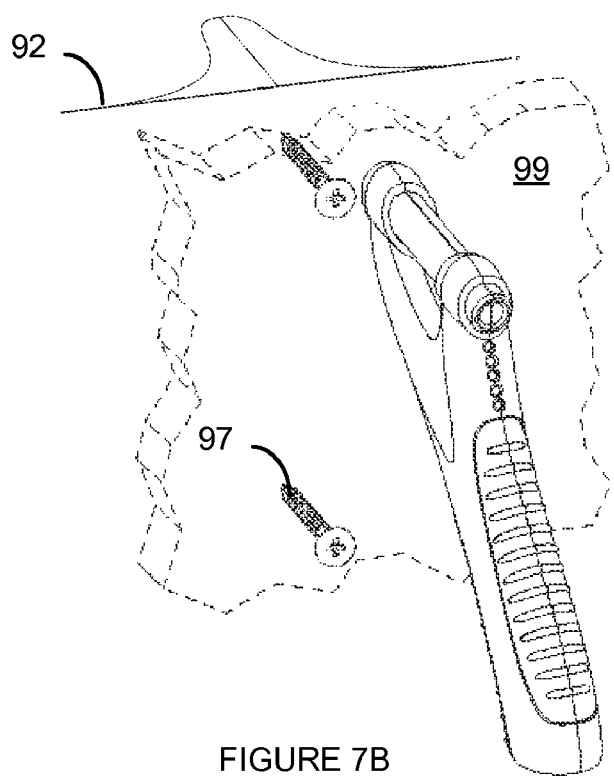

The graph at the top of FIG. 7A shows that a sensor positioned parallel to a small metal object 97 results in a detection curve with a relatively large area having deep penetration. Thus, detection may be more sensitive. In contrast, the graph at the top of FIG. 7B shows that a sensor positioned perpendicular to the small metal object 97 results in a detection curve with a smaller area providing pinpoint-like detection. Thus, detection may be more localized to find a location of a small metal object 97.

Figure 8:
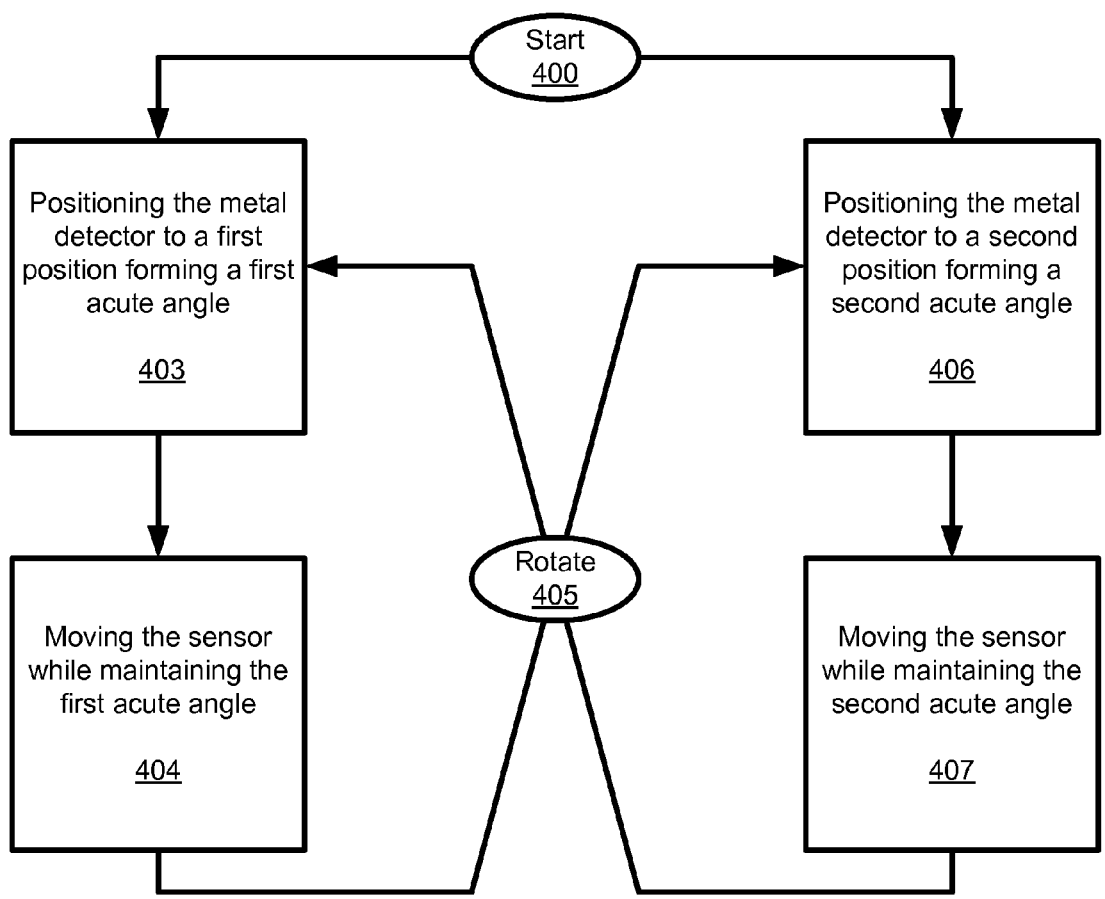
FIG. 8 illustrates a procedure or using a metal detector, in accordance with embodiments of the present invention.

FIG. 8 illustrates a procedure for using a metal detector, in accordance with embodiments of the present invention. At 400, a process may begin with transitioning to either 403 or 406. At 403, an operator positions the metal detector 100 in a first position such that the center axis 201 of the sensor 200 is parallel to a surface 99 thereby forming a first acute angle between the center axis 301 of the handle 300 and the surface 99. Next at 404, the operator moves the sensor 200 parallel to the surface 99 to attempt to detect a metal object while maintaining the first acute angle. At 406, the operator positions the metal detector 100 in a second position such that the center axis 201 of the sensor 200 is perpendicular to a surface 99 thereby forming a second acute angle between the center axis 301 of the handle 300 and the surface 99. Next at 407, the operator moves the sensor 200 parallel to the surface 99 to attempt to detect a metal object while maintaining the second acute angle. At 405, the operator transitions between the first and second positions by rotating or spinning the metal detector 100. When rotating or spinning the metal detector 100, the operator may re-position the metal detector 100 between the first and second positions by rotating the handle 300, relative to a hand of the operator, 180 degrees. To minimize excessive motion, the first and second acute angles are each between 30 degrees and 60 degrees. In some embodiments, the first and second acute angles are each between 40 degrees and 50 degrees. In some embodiments, the first and second acute angles are each 45 degrees.

Figure 9A:
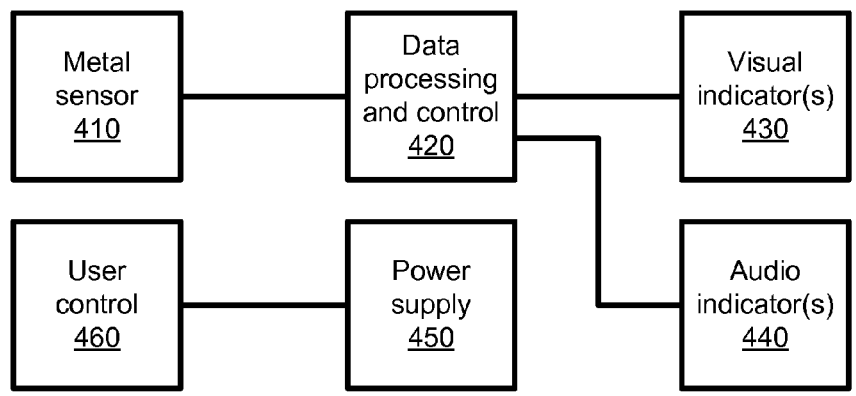
FIGS. 9A and 9B show a block diagram and a schematic diagram of a metal detector, in accordance with embodiments of the present invention.
Figure 9B:
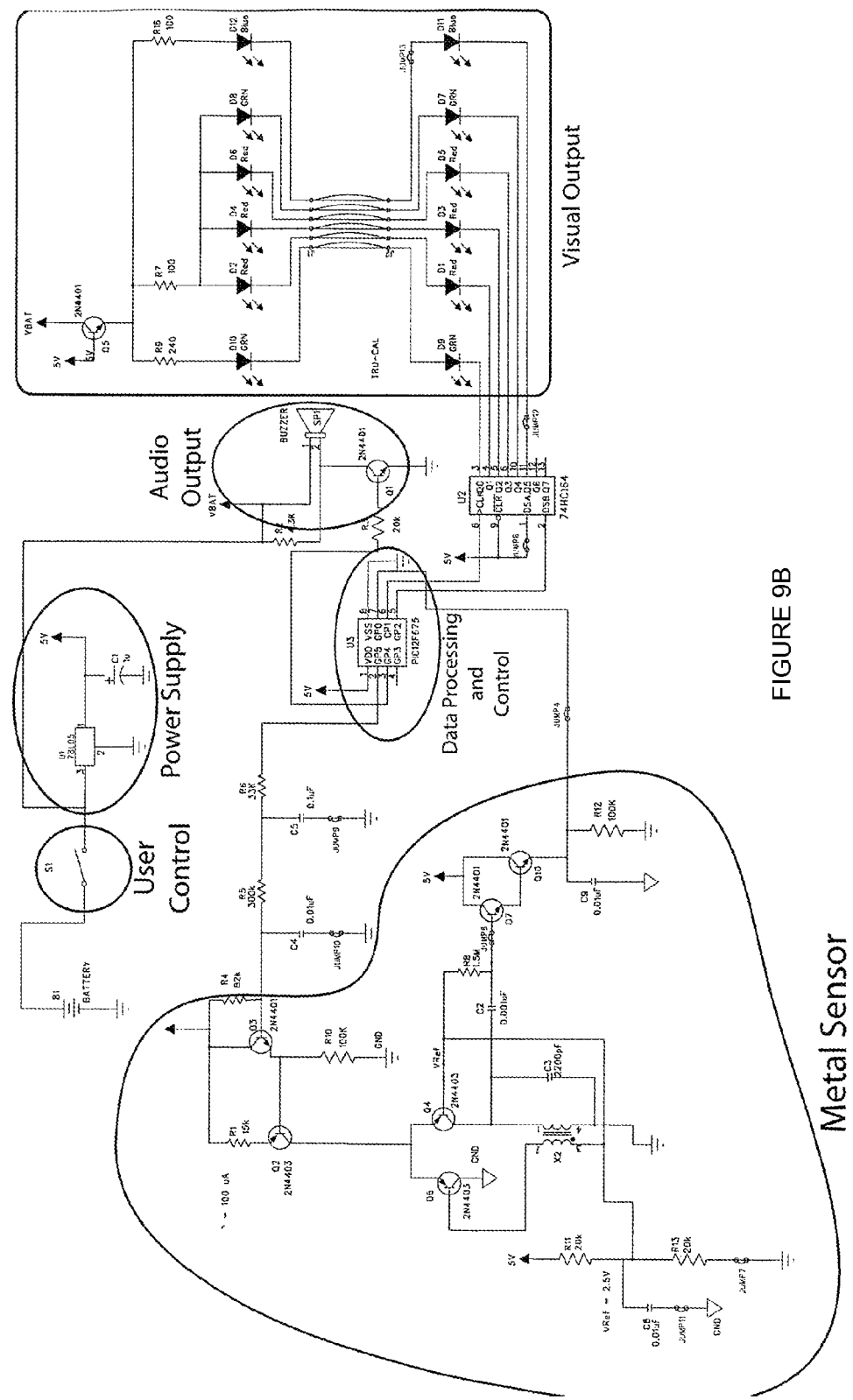

FIGS. 9A and 9B show a block diagram and a schematic diagram of a metal detector 100, in accordance with embodiments of the present invention. In some embodiments, a metal detector 100 includes a metal sensor 410, data processing and control circuit 420, one or more visual indicators 430, one or more audio indicators 440, a power supply 450 and user control 460.

FIG. 9B shows a metal sensor 410 including a resonant LC tank circuit with a transformer (e.g., having 80 to 100+/−20 windings on the primary side and 4 to 5 windings on the secondary side. The transformer is coupled to a current mirror to provide an oscillating signal for sensing. The metal sensor 410 may be operated in a start configuration such that the envelope amplitude of the oscillating signal from the transformer is reduced with the introduction of sensed metal. A pair of transistors measures the changes in the envelope which may be forwarded to the data processing and control circuit 420. The data processing and control circuit 420 may be a micro controller, a microprocessor, an ASIC, or the like. The data processing and control circuit 420 may drive one or more visual indicators 430 and/or one or more audio indicators 440. Shown are two banks of LEDs. A first bank represents the first visual indicator 401 and a second bank represents the second visual indicator 402. As describe above, the first and second banks may be mirrored as shown. An audio indicator 440 may include a buzzer and driving circuitry controlled by the data processing and control circuit 420. User control 460 represents switch 304 described above, which may electrically connect a battery or other power source to the power supply 450, which supplies power to the metal sensor 410, data processing and control circuit 420, the one or more visual indicators 430, and the one or more audio indicators 440.

The description above provides various hardware embodiments of the present invention. Furthermore, the figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the claims. The description is not intended to be exhaustive or to limit the invention to the precise form disclosed. It should be understood that the invention can be practiced with modification and alteration.

What is claimed is:

1. A metal detector comprising:
    a sensor comprising a core and a coil around the core, wherein the coil defines a center axis of the sensor; and
    a handle coupled to the sensor, wherein the handle defines a center axis of the handle, and wherein the handle positions the sensor in a selectable one of two operating positions comprising a first position wherein the center axis of the sensor is parallel to a surface and a second position wherein the center axis of the sensor perpendicular to the surface;
    wherein the center axis of the sensor and the center axis of the handle define an acute angle between 30 and 60 degrees.

2. The metal detector of claim 1, wherein the core comprises a ferrous core.

3. The metal detector of claim 1, further comprising:
    a first indicator operable to indicate a relative measurement between the sensor and an object; and
    a second indicator operable to indicate the relative measurement between the sensor and the object.

4. The metal detector of claim 3, wherein the first indicator comprises a series of light emitting elements.

5. The metal detector of claim 3, further comprising a third indicator comprises an audible sound generator.

6. The metal detector of claim 3, wherein the first indicator is positioned for observation when the center axis of the sensor is perpendicular to the surface, and wherein the second indicator is positioned for observation when the center axis of the sensor is parallel to the surface.

7. The metal detector of claim 3, wherein the handle comprises the first indicator and the second indicator.

8. The metal detector of claim 1, further comprising a fourth indicator positioned for observation both when the center axis of the sensor is perpendicular to the surface and when the center axis of the sensor is parallel to the surface.

9. The metal detector of claim 8, wherein the sensor further comprises the fourth indicator.

10. The metal detector of claim 8, wherein the fourth indicator illuminates at least a portion of the sensor.

11. The metal detector of claim 1, wherein the center axis of the sensor and the center axis of the handle define a plane.

12. The metal detector of claim 1, wherein the acute angle is between 40 degrees and 50 degrees.

13. The metal detector of claim 1, wherein the acute angle is 45 degrees.

14. The metal detector of claim 1, wherein the handle and the sensor are fixedly coupled.

15. A metal detector comprising:
    a sensor comprising a core and a coil around the core, wherein the sensor defines a center axis; and
    a handling means for positioning the sensor in a selectable one of two positions comprising a first position wherein the center axis of the sensor is parallel to a surface and a second position wherein the center axis of the sensor perpendicular to the surface;
    wherein the handling means defines a center axis of the handling means; and
    wherein the handling means defines a first angle between the center of axis of the handling means and the surface when the metal detector is in the first position and further defines a second angle between the center of axis of the handling means and the surface when the metal detector is in the second position, wherein the first and second angles are between 30 and 60 degrees.

16. The metal detector of claim 15, further comprising:
    a first indicator means for indicating a relative measurement between the sensor and an object; and
    a second indicator means for indicating the relative measurement between the sensor and the object.

17. The metal detector of claim 16, wherein the first indicator means is positioned for observation when the metal detector is in the first position, and the second indicator means is positioned for observation when the metal detector is in the second position.

18. The metal detector of claim 16, further comprising a third means for indicating the relative measurement between the sensor and the object.

19. The metal detector of claim 16, wherein the third means is positioned for observation both when the metal detector is in the first position and when the metal detector is in the second position.

20. The metal detector of claim 19, wherein the third means comprises an audible indicator.

21. The metal detector of claim 19, wherein the third means comprises a visual indicator.

22. A method of using a metal detector comprising a sensor and a handle to find an object hidden by a surface, wherein the sensor comprises a coil defining a center axis of the sensor and wherein the handle defines a center axis of the handle, the method comprising:
    positioning the metal detector to a first position wherein the center axis of the sensor is parallel to the surface forming a first acute angle between the center axis of the handle and the surface;
    moving the sensor parallel to the surface while maintaining the first acute angle;
    positioning the metal detector to a second position wherein the center axis of the sensor is perpendicular to the surface forming a second acute angle between the center axis of the handle and the surface; and
    moving the sensor parallel to the surface while maintaining the second acute angle.

23. The method of claim 22, wherein the act of positioning the metal detector to the second position comprises rotating the handle, relative to a hand, 180 degrees.

24. The method of claim 22, wherein the first acute angle is between 30 degrees and 60 degrees and the second acute angle is between 30 degrees and 60 degrees.

25. The method of claim 22, wherein the first acute angle is between 40 degrees and 50 degrees and the second acute angle is between 40 degrees and 50 degrees.

* * * * *